“United States Patent Office” — 3,148,096 — Patented Sept. 8, 1964

3,148,096
AMMONIUM NITRATE GAS GENERATING COMPOSITION WITH COMBUSTION CATALYST
Walter W. Butcher, South Bend, Ind., assignor to Standard Oil Company, Chicago, Ill., a corporation of Indiana
No Drawing. Filed Feb. 18, 1958, Ser. No. 715,987
8 Claims. (Cl. 149—19)

This is a continuation-in-part of my copending application Serial No. 543,596, filed October 28, 1955, now abandoned.

This invention relates to ammonium nitrate-type compositions and particularly a catalyst for promoting the combustion of ammonium nitrate containing compositions.

In gas generation and rocketry usages it is necessary that the gas affording composition develop gas at a uniform rate; in the art this is spoken of as burning at a uniform rate. In ammonium nitrate compositions which consist essentially of ammonium nitrate particles and an oxidizable organic material (in order to permit the shaping of the composition into a definite configuration or grain) it is necessary to promote the combustion of the composition by the use of a combustion catalyst. Well known catalysts are the inorganic chromium compounds particularly, ammonium dichromate. In the military field the Prussian blues have attained eminence. These and other metallic catalysts have the drawback of forming oxides with very high melting points. It is thought that these solid oxide products in the combustion gases are the cause of nozzle erosion. Nozzle erosion results in erratic change in gas pressure within the gas generator or rocket motor.

An object of the invention is an ammonium nitrate composition. A particular object of the invention is an ammonium nitrate composition having low erosive characteristics. A further object is an ammonium nitrate composition whose burning rate is relatively insensitive to variations in burning chamber pressure. Other objects will become apparent in the course of the detailed description.

It has been found than an eminently suitable ammonium nitrate-type composition for gas generator and rocketry usage is obtained with ammonium nitrate as the predominant component, between about 10 and 40 weight percent of oxidizable organic material and between about 0.5 and 15 weight percent of alkali metal salt of barbituric acid as the combustion catalyst. This catalyst burns to form products which are either gas or vapors at the temperature existent in the burning chamber and these products have no appreciable nozzle erosive activity.

The alkali metal salt of barbituric acid may be prepared by reacting barbituric acid with an equivalent amount of alkali metal hydroxide sufficient to produce the salt containing one or two atoms of alkali metal per barbiturate radical. The mono salt is preferred. Ethyl alcohol or water may be used as the reaction medium and barbituric acid is slurried therein. The alkali metal hydroxide is added to this slurry at ambient temperature and the exothermic heat of the reaction causes the temperature of the reaction mixture to rise. The temperature of the mixture is controlled to not exceed about 75° C. The insoluble alkali metal barbiturate is filtered from the reaction mixture following the completion of the reaction and the product is washed with water or ethyl alcohol and dried.

Sufficient catalyst must be introduced into the composition to promote the burning of the composition. The amount of catalyst used is also influenced by the rate of burning desired. The more catalyst present the faster the combustion of the composition. It is to be understood that the burning rate is also affected by the particular oxidizable organic material present. In general, the composition will contain between about 0.5 and 15 weight percent of the catalyst. (Hereinafter all percentages are to be understood as weight percent.) With the thermoplastic matrix formers or binders obtained from cellulose esters and oxygenated hydrocarbon plasticizers therefor between about 1 and 6% catalyst produces satisfactory burning rates for typical military gas generation and rocketry usages.

The improved composition of the invention contains ammonium nitrate as the major component. The ammonium nitrate may be ordinary commercial ammonium nitrate such as is used for fertilizers. This commercial grade material contains a small amount of impurities and the particles are usually coated with moisture resisting material such as paraffin wax. Military grade ammonium nitrate which is almost chemically pure is particularly suitable. The ammonium nitrate is preferably in a finely divided particulate form which may be either produced by prilling or by grinding. The ammonium nitrate is the major component of the gas-generator composition and usually the composition will contain between about 65 and 80% of ammonium nitrate.

In order to permit the shaping of the ammonium nitrate composition into definite configurations a matrix former or binder material is present. Ammonium nitrate possesses oxidizing power in excess of that required for complete self-decomposition. Advantage of this excess power is taken by oxidizable materials being used as the binders. These oxidizable organic materials may contain only carbon and hydrogen, for example, high molecular weight hydrocarbons such as asphalts or residuums, and rubbers either natural or synthetic. Or, the oxidizable organic material may contain other elements in addition to carbon and hydrogen for example, Thiokol rubber and neoprene. The stoichiometry of the composition is improved, with respect to smoke production, by the use of oxygenated organic materials as the binders. The binder or matrix former may be a single compound such as a rubber or asphalt or it may be a mixture of compounds. The mixtures are particularly suitable when special characteristics are to be imparted to the grain which cannot be obtained by the use of a single compound.

The multi-component binder or matrix former commonly consists of a polymeric base material and a plasticizer therefor. Particularly suitable polymeric base materials are cellulose esters of alkanoic acids containing from 2 to 4 carbon atoms such as cellulose acetate, cellulose acetate butyrate and cellulose propionate; the polyvinyl resins such as polyvinylchloride and polyvinyl acetate are also good bases; styrene acrylonitrile is an example of a copolymer which forms a good base material. In general the binder contains between about 15 and 45% of the particular polymeric base material.

The plasticizer component of the binder is broadly defined as an oxygenated hydrocarbon. The hydrocarbon base may be aliphatic or aromatic or may contain both forms. The oxygen may be present in the plasticizer in ether linkage and/or hydroxyl group and/or carboxyl groups; also the oxygen may be present in inorganic substituents particularly nitro groups. In general any plasticizer which is suitable for work with the defined polymers may be used in the invention.

Exemplary classes of plasticizers which are suitable are set out below. It is to be understood that these classes are illustrative only and do not limit the types of oxygenated hydrocarbons which may be used to plasticize the polymer.

Di-lower alkyl-phthalates, e.g., dimethyl phthalate, dibutyl phthalate dioctyl phthalate and dimethyl nitrophthalate.
Nitrobenzenes, e.g., nitrobenzene, dinitrobenzene, nitrotoluene, dinitrotoluene, nitroxylene, and nitrodiphenyl.
Nitrodiphenyl ethers, e.g., nitrodiphenyl ether and 2,4-dinitrodiphenyl ether.

Tri-lower alkyl-citrates, e.g., triethyl citrate, tributyl citrate and triamyl citrate.

Acyl tri-lower alkyl-citrates where the acyl group contains 2–4 carbon atoms, e.g., acetyl triethyl citrate and acetyl tributyl citrate.

Glycerol-lower alkanoates, e.g., monoacetin, triacetin, glycerol, tripropionate and glycerol tributyrate.

Lower alkylene-glycol-lower alkanoates wherein the glycol portion has a molecular weight below about 200, e.g., ethylene glycol diacetate, triethylene glycol dihexoate triethylene glycol dioctoate, polyethylene glycol dioctoate, dipropylene glycol diacetate, nitromethyl propanediol diacetate, hydroxyethyl acetate and hydroxy propyl acetate (propylene glycol monoacetate).

Dinitrophenyl-lower alkyl-lower alkanoates, e.g., dinitrophenyl ethylacetate, and dinitrophenyl amyloctoate.

Lower alkylene-glycols wherein the molecular weight is below about 200, e.g., diethylene glycol, polyethylene glycol (200), and tetrapropylene glycol.

Lower alkylene-glycol oxalates, e.g., diethylene glycol oxalate and polyethlene glycol (200) oxalate.

Lower alkylene-glycol maleates, e.g., ethylene glycol maleate and bis-(diethylene glycol monoethyl ether) maleate.

Lower alkylene-glycol diglycollates, e.g., ethylene glycol diglycollate and diethylene glycol diglycollate.

Miscellaneous diglycollates, e.g., dibutyl diglycollate, dimethylalkyl diglycollate and methyl-Carbitol diglycollate.

Lower alkyl-phthalyl-lower alkyl-glycollate, e.g., methyl phthalyl ethyl glycollate, ethyl phthalyl ethyl glycollate and butyl phthalyl butyl glycollate.

Di-lower alkyloxy-tetraglycol, e.g., dimethoxy tetra glycol and dibutoxy tetra glycol.

Nitrophenylether of lower alkylene glycols, e.g., dinitrophenyl ether of triethylene glycol and nitrophenyl ether of polypropylene glycol.

Nitrophenoxy alkanols wherein the alkanol portion is derived from a glycol having a molecular weight of not more than about 200. These may be pure compounds or admixed with major compound bis(nitrophenoxy) alkane.

A single plasticizer may be used or more usually two or more plasticizers may be used in conjunction. The particular requirements with respect to use will determine not only the polymer but also the particular plasticizer or combination of plasticizers which are used.

In addition to the basic components, i.e., ammonium nitrate binder and catalyst, the gas-generator propellant composition may contain other materials. For example, materials may be present to improve low temperature ignitability, for instance oximes may be present or, asphalt may be present. Surfactants may be present in order to improve the coating of the nitrate with the binder and to improve the shape characteristics of the composition. Various burning rate promoters, which are not catalyst per se, may also be present.

For example: Carbon may be used in the composition when it is used along with the alkali metal barbiturate catalyst particularly when the composition is used in the form of propellant grains, i.e., in a suitable form for service use. The carbon is preferably finely divided carbon which will pass through a #100 U.S. Standard sieve. Highly-adsorptive activated carbons such as "Norit" and "Nuchar," well-known in the art as activated carbon, made from residual organic material make up one class of effective burning rate promoters. A second general class of carbon useful for increasing the burning rate of the compositions are the carbon blacks, roughly classified as the channel blacks and the furnace combustion blacks. The carbon blacks are characterized by low ash content, that is, less than 0.5% and usually less than about 0.15%, and having extremely small particle size, that is, 50 to 500 A. and contain adsorbed hydrogen and oxygen. However, to avoid dusting and to afford convenience in handling, some carbon blacks are formed to the so-called "bead" type carbon blacks. The "beads" are extremely soft and physically unstable and hence become disintegrated during the mililng of the composition. A third type of carbon which may be used in the composition is finely ground petroleum coke, particularly petroleum coke obtained as residue in the pipestilling of mid-continent heavy residuums. Such coke usually contains less than about 1% ash and hence, like the carbon blacks, is particularly suitable for use in gas-producing grains where solid inorganic particles in the combustion gas must be kept to a minimum when used in the gas-forming propellant compositions.

As an aid to ignition at low temperatures of the composition when shaped into grains, a small amount of asphalt may be added to the composition. Amounts of asphalt up to about 5% by weight of the composition are effective to promote low temperature ignition of the composition. The addition of asphalt components required oxygen to obtain stoichiometrically balanced combustion of the composition to form carbon monoxide and carbon dioxide and hence the amount used is kept to that minimum required to give satisfactory ignition and/or physical characteristics of the grains shaped from the propellant composition.

The aromatic hydrocarbon amines are known to be gas evolution stabilization additives. Examples of these aromatic amines are toluene diamine, diphenyl amine, napthalene diamine, and toluene triamine. In general the aromatic hydrocarbon amines are used in amounts between about 0.5 and 5%.

For such uses as rocket propulsion, assist take-off service and gas generation for starting up of the turbine of a jet engine, a gas-producing propellant is desired which has non-detonating characteristics rather than detonating characteristics of ordinary ammonium nitrate explosives. The burning characteristics of most detonating explosives are dependent upon the temperature and pressure in the combustion chamber. The pressure exponent is the numerical value equal to the slope of the curve of the burning rate in inches per second obtained by plotting the burning rate at various pressures usually 600 p.s.i. to 1800 p.s.i., on log-log paper. The burning rates being plotted vertically and pressures being plotted horizontally. The lower the value of the pressure exponent the less is the detonating character of the decomposition of a gas-producing composition and the more even and smooth is the burning of the propellant grain. Thus a sustained thrust rather than a detonation is obtained by smooth burning of the grain and a sustained flow of gas from the gas generator is obtained if the pressure exponent of the composition is low. The pressure exponent of the burning rate should be less than about 0.9 and preferably below about 0.7.

One method of preparing the compositions for use in grain form is as follows. The binder material is first prepared and the ammonium nitrate and catalyst are milled with plasticized binder. The binder is prepared by heating the plasicizer material to a temperature below about 150° C. usually within the range of from about 120° C. to about 140° C. The heated liquid or semi-liquid plasticizer material is stirred and the polymeric base material is added, heating and stirring being continued until a homogeneous mixture is obtained. The barbiturate catalyst may be thoroughly mixed, with or without the carbon, with the powdered ammonium nitrate before addition to the binder material. On the other hand, the catalyst may be added immediately preceding the addition of the ammonium nitrate. The ammonium nitrate and catalyst are then milled in the plasticized mass at a temperature not in excess of about 135° C. Milling is continued until a product of uniform texture is obtained, after which the material is molded into shaped propellant grains and burning rate test strips at temperatures not in excess of 135° C.

In preparing the burning rate test strips, the formulated composition is molded at 2000 pounds of pressure into rectangular strips of about one inch by three quarters inch cross-sectional dimension. These strips are cut into twelve ¼" by ¼" test strips about 5 inches in length for use in determining burning rates. The strips are provided with drilled holes 3" apart through which are passed fusible wires which are connected to a timing device for obtaining the burning rates.

The test strips are tested for burning rate in a pressure bomb and are coated with lacquer grade cellulose acetate or other suitable plastic to inhibit surface burning along the test piece thus causing the strip to burn like a cigarette. The test piece is placed in the pressure bomb and electrical connection of the fuse wires is made to the timing device. The timing device is started by the fusing of one wire and as the test piece burns along its length the timing device is stopped by the fusing of the second wire. Thus, the time for burning of 3" of the test piece is obtained. The test piece is ignited by means of a Nichrome resistance wire. Burning rates for the test pieces are determined at different pressures in an atmosphere of nitrogen.

Gas-producing grains may be prepared by molding the compositions into cylindrical grains under a pressure of about 2000 to 6000 and at a temperature of about 105° C. The size and shape of the grains for commercial or military use will depend, of course, upon their intended use. For starting a jet engine the grains are usually cylindrical in shape and about 5" in diameter and 4" in length but may be about 3 to 6 inches in diameter and about 3 to 6 inches in length. The assist takeoff grains may be about 2 to 3 feet in length. The grains are usually provided with a hole or opening extending lengthwise of the grain to provide an aperture which may be circular, starform, cruciform, etc., to afford increased burning surface. Such grains may be mounted in a conventional case and may be ignited or fired by electrical or other known means. The combustion of the grains is restricted with respect to burning area by coating the annular ends with a material such as cellulose acetate or asphalt, thus causing the grain to burn only from the internal surface of the centrally located aperture and from the cylindrical surface of the grain.

*Example 1*

A commercial grade of ammonium nitrate was ground to a fine powder by a single pass through a pulverizer operated at 7500 r.p.m. Seventy-seven parts by weight of the finely ground ammonium nitrate were intimately mixed with three parts by weight of monosodium barbiturate, eight parts by weight of polyvinyl acetate having a viscosity of about 800 centiposes at 20° C. determined as a benzene solution containing 86 grams of the polyvinyl acetate per 1000 cc. of the solution, and twelve parts by weight of 2,4-dinitrodiphenyl ether prepared by condensing equimolar amounts of the 2,4-dinitrochlorobenzene with phenol in aqueous caustic medium as described in the copending application of Wayne A. Proell and Norman J. Bowman entitled, "Thermoplastic Compositions," Serial No. 465,132, filed October 27, 1954, now Patent 2,942,994. Mixing of these components was carried out for a period of 1.5 hours at a mixture temperature of 120° C. to obtain a homogeneous plasticized product. The product was then molded at 110° C. and at a pressure of 2000 p.s.i. to obtain ¼" x ¼" x 5" strands. These were tested for burning rate in a pressure bomb.

The burning rate of these strands at a nitrogen pressure of 1800 p.s.i. was 0.13" per second. A control composition containing 80 parts by weight of the ammonium nitrate, 12 parts by weight of the 2,4-dinitrodiphenyl ether and 8 parts by weight of the polyvinyl acetate was prepared and molded strands were prepared and tested. These strands had a burning rate of 0.10" per second at 1800 p.s.i. when tested in the pressure bomb.

Comparing the burning rates of these compositions the presence of the monosodium barbiturate increased the burning rate at 1800 pounds pressure by 30%.

*Example 2*

A composition was prepared according to the same procedure using the same components as outlined in Example 1 except that 3 parts by weight of an easy-processing furnace carbon black was substituted for 3 parts of the 77 parts of ammonium nitrate in the composition. The gas-producing composition consisted (on a weight basis) of 74% ammonium nitrate, 8% polyvinyl acetate, 12% of 2,4-dinitrodiphenyl ether, 3% sodium barbiturate catalyst and 3% of the carbon black. Strands of this product were prepared as described above. These strands had a burning rate of 0.09" per second at 1000 p.s.i. and a burning rate of 0.14" per second at 1800 p.s.i. Comparing the result with the control sample and with the composition containing the monosodium barbiturate catalyst but no carbon, the burning rate at 1800 pounds was increased by the presence of the carbon. Strands formed from this composition ignited and burned readily at 1000 pounds and burned more uniformly than the composition containing no carbon. The burning rate at 1000 p.s.i. was 0.09" per second.

*Example 3*

Test strips and also full size gas-generator cartridges weighing about 4 pounds each were prepared using cellulose acetate as the polymer and oxygenated hydrocarbon plasticizer. The composition of this particular grain is: Cellulose acetate, lacquer grade 6%, acetyl triethyl citrate 7%, dinitrophenoxy ethanol 6%, asphalt 1%, carbon black 3%, toluene diamine 1%, sodium barbiturate 3%, and ammonium nitrate 73%. This composition had a burning rate at 1000 p.s.i. of 0.094" per second; the pressure exponent of this composition was 0.48.

A control composition was prepared identical to the above except that the sodium barbiturate was replaced with ammonium nitrate. The control composition had a burning rate at 1000 p.s.i. of 0.068" per second and a pressure exponent of 0.86.

*Example 4*

Test strips were made of a composition using styrene-acrylonitrile as the polymer. This composition contained ammonium oxalate as an additive to lower the flame temperature of the gases. This composition consisted of: Styrene-acrylonitrile 5.9%, di(dinitrophenyl)triglycol ether 4.2%, acetyltriethyl citrate 2.8%, dinitrotoluene 2.4%, dinitrodiphenol oxide 3.6%, asphalt 1.1%, ammonium oxalate 2%, toluene diamine 1%, carbon 2%, sodium barbiturate 3%, and ammonium nitrate 72%. The burning rate of this composition at 1000 p.s.i. was 0.099" per second and the pressure exponent was 0.67.

A control composition was prepared differing from the above only in that the sodium barbiturate was replaced with ammonium nitrate. The control composition had a burning rate at 1000 p.s.i. of 0.060" per second and a pressure exponent of 0.85.

Thus having described the invention, what is claimed is:

1. A composition consisting essentially of ammonium nitrate as the predominant component, between about 1 and 6 weight percent of monoalkali-metal barbiturate, between about 20 and 35 weight percent of a binder consisting of a cellulose ester of an alkanoic acid containing 2 to 4 carbon atoms and an oxygenated hydrocarbon plasticizer therefor.

2. A composition consisting of about 6 percent of celluose acetate, lacquer grade, of about 7 percent of acetyl triethyl citrate, of about 6 percent of dinitrophenoxy ethanol, of about 1 percent asphalt, of about 3 percent of carbon black, of about 1 percent of toluene diamine, of about 3 percent of sodium barbiturate, and of about 73 percent of ammonium nitrate.

3. A composition consisting of about 8 percent of polyvinyl acetate, of about 12 percent of 2,4-dinitrodiphenyl ether, of about 3 percent of carbon black, of about 3 percent of sodium barbiturate catalyst, and of about 74 percent of ammonium nitrate.

4. In a solid gas generating composition comprising predominantly ammonium nitrate, the improvement of incorporating therein an alkali metal salt of barbituric acid in an amount sufficient to catalyze the burning of the ammonium nitrate.

5. The composition of claim 4 wherein said salt is sodium barbiturate.

6. In a solid gas generating composition comprising ammonium nitrate as the predominant component, oxidizable organic binder material, and at least one combustion catalyst in an amount sufficient to catalyze the burning of the ammonium nitrate, the improvement of using an alkali metal barbiturate as a combustion catalyst.

7. A solid propellant composition consisting essentially of ammonium nitrate as the predominant component, an oxidizable organic binder material, and an amount of an alkali metal salt of barbituric acid sufficient to catalyze the burning of the ammonium nitrate.

8. A composition of claim 7 wherein said salt is sodium barbiturate.

References Cited in the file of this patent
FOREIGN PATENTS 655,585      Great Britain _____ July 25, 1951

OTHER REFERENCES

Chem. and Eng. News, October 7, 1957, pp. 62–63.

UNITED STATES PATENT OFFICE
CERTIFICATE OF CORRECTION

Patent No. 3,148,096                               September 8, 1964

Walter W. Butcher

It is hereby certified that error appears in the above numbered patent requiring correction and that the said Letters Patent should read as corrected below.

Column 4, line 7, for "500" read -- 5000 --.

Signed and sealed this 12th day of January 1965.

(SEAL)
Attest:

ERNEST W. SWIDER                            EDWARD J. BRENNER
Attesting Officer                                   Commissioner of Patents